(No Model.) 2 Sheets—Sheet 1.

G. HEINICKE.
ROTARY MOTOR.

No. 518,145. Patented Apr. 10, 1894.

Witnesses:
A. Walther
Carl Rossbach

Inventor:
Gustav Heinicke
by Robert Burke
Attorney.

(No Model.) 2 Sheets—Sheet 2.
G. HEINICKE.
ROTARY MOTOR.
No. 518,145. Patented Apr. 10, 1894.
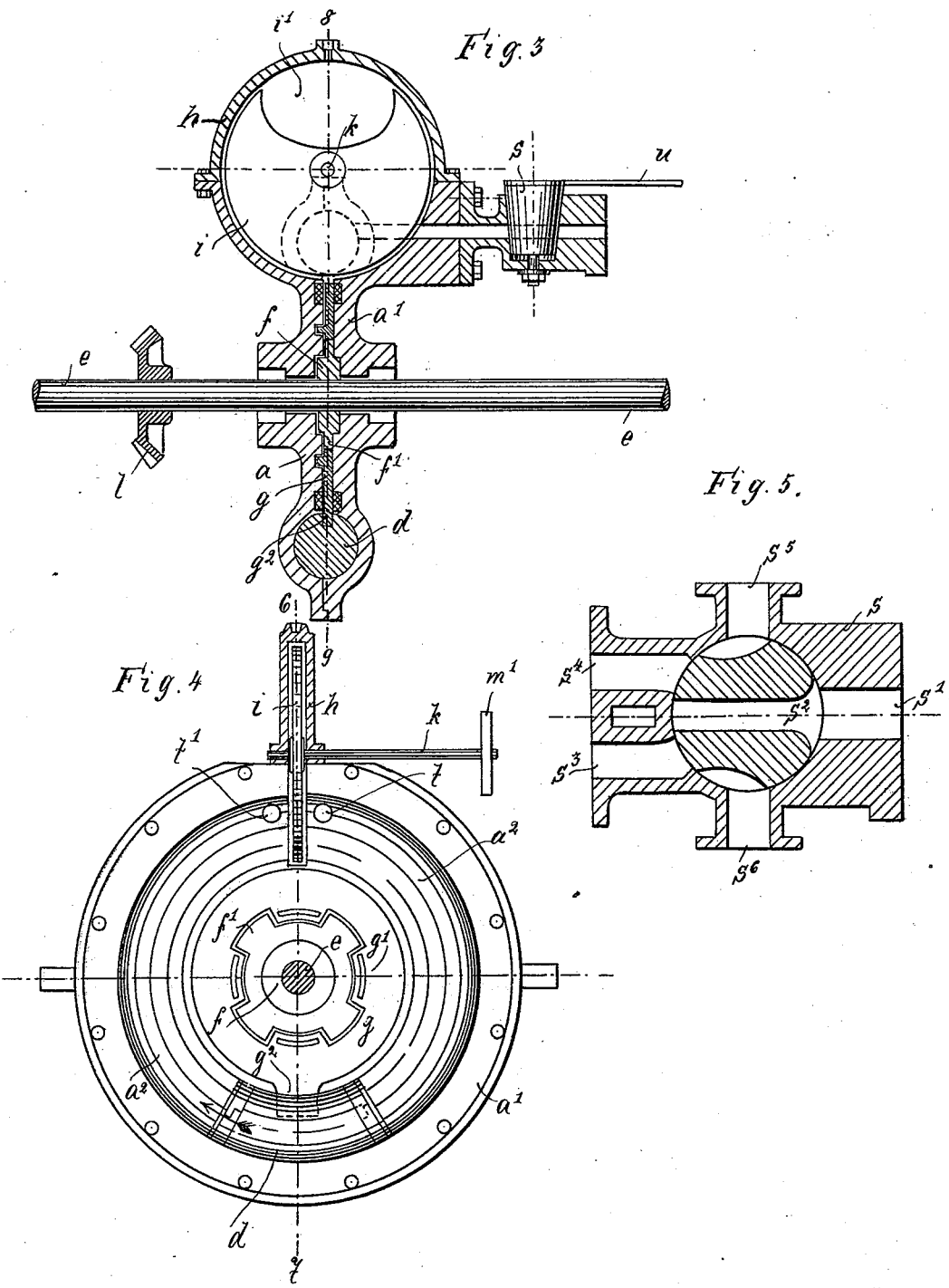
Witnesses:
A. Walther
Carl Rossbach
Inventor:
Gustav Heinicke
by Robert Schuler
Attorney.

UNITED STATES PATENT OFFICE.

GUSTAV HEINICKE, OF BERLIN, GERMANY.

ROTARY MOTOR.

SPECIFICATION forming part of Letters Patent No. 518,145, dated April 10, 1894.

Application filed August 9, 1893. Serial No. 482,775. (No model.)

*To all whom it may concern:*

Be it known that I, GUSTAV HEINICKE, manufacturer, a subject of the King of Prussia, German Emperor, residing at Berlin, in the Province of Brandenburg, Kingdom of Prussia, German Empire, have invented new and useful Improvements in Rotary Motors, of which the following is a specification.

My invention relates to rotary steam-engines, in which the piston has the shape of a ring-sector, and moves around within a ring-like space of a disk-like cylinder, through the center of which the engine- or main-shaft, driven from said piston, is passed; and my improvements in such rotary steam-engines relate to the mode of connection between piston and shaft, or, in other words, to the mode of transmitting the motion of the piston to said shaft.

In order to make my invention more clear, I refer to the accompanying drawings, in which similar letters denote similar parts and in which—

Figure 1:
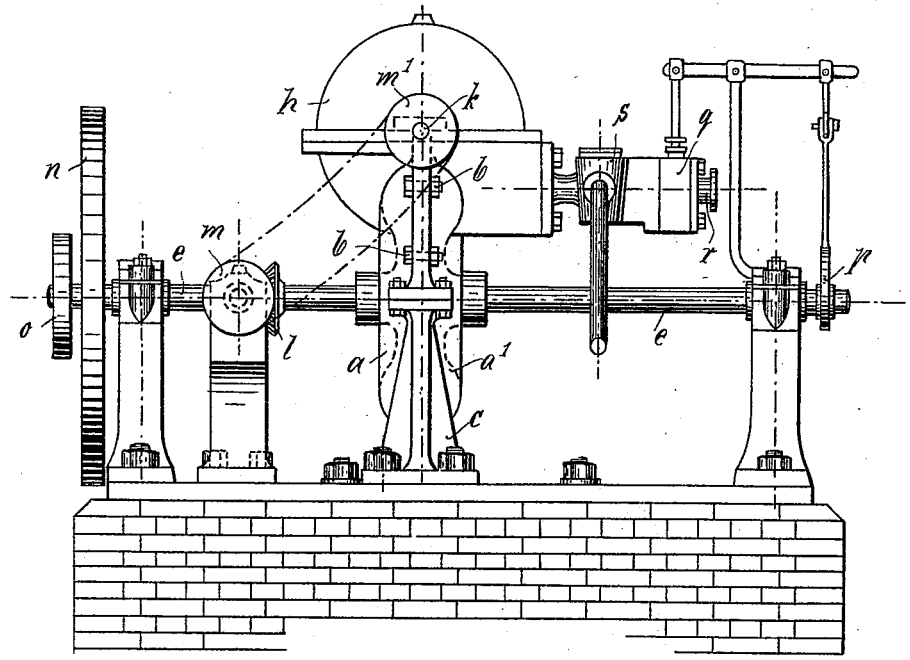
Figure 2:
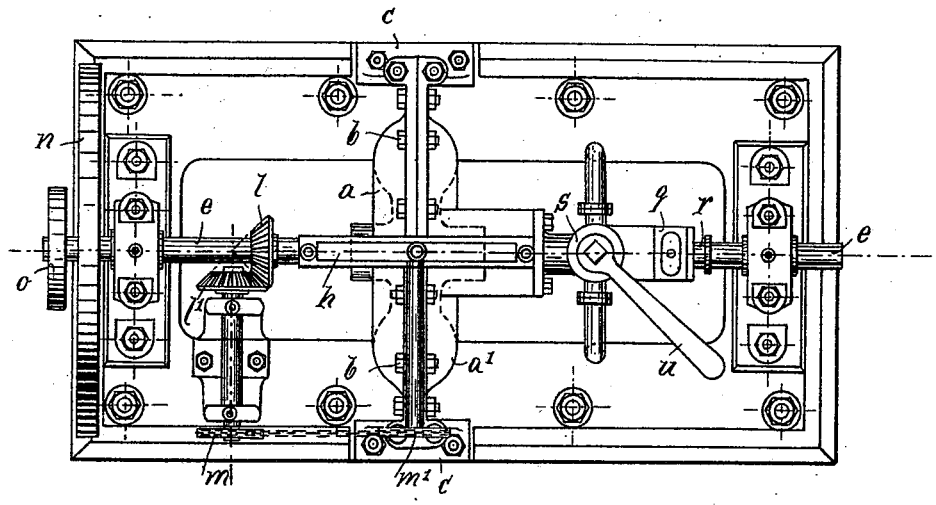

Figure 1 is a side-view of my improved motor; Fig. 2 an upper view of the same; Fig. 3 a vertical cross-section through the cylinder, taken on line 6—7 of Fig. 4, and drawn on a larger scale; Fig. 4 a vertical longitudinal section through the cylinder, taken on line 8—9 of Fig. 3, and being also drawn on the larger scale; and Fig. 5 is a horizontal section through the reversing-cock, drawn on a scale still larger than that of Figs. 3 and 4.

The cylinder consists of the two like parts $a$ $a'$, each of which has an annular groove $a^2$. Both parts are firmly connected with each other by the bolts $b$, and the whole cylinder is supported by the standards $c$. Both the grooves $a$ together form the ring-like way in which the piston $d$ moves around. The opposite inner faces of the parts $a$ $a'$ of the cylinder fit tightly upon another only beyond the grooves, but leave a flat space between themselves at the part around the center, as is best to be seen in Fig. 3. This space affords the possibility of connecting the piston $d$ with the shaft $e$, which is accomplished in the following manner: To shaft $e$ is firmly secured the disk $f$, which, at its rim, is provided with the teeth $f'$, Fig. 4. This disk is surrounded by a disk-like ring $g$, which, at its inner rim, has the teeth or projections $g'$, and, at its outer rim, the projection $g^2$. The teeth $g'$ catch loosely into the spaces between the teeth $f'$ of disk $f$, and the projection $g^2$ catches loosely into a suitable hole provided within the piston $d$. By reason of this mode of connection, the ring $g$ may give way axially as well as radially, independent of the shaft and the piston, and, therefore, the transmission of the motion will take place with far greater ease, and with less loss of power, than has been attainable in such motors heretofore, especially when, in case of unequal warming of the parts in question, distortions of said parts should occur.

For the rest, the construction and manner of working of the motor is as follows: The cylinder $a$ $a'$ carries transversely on its headpart a casing $h$, within which rotates the disk $i$ with its cut $i'$. Said disk is fixed to a shaft $k$, which is rotated from main-shaft $e$ by the bevel-wheels $l$ $l'$ and the chain-wheels $m$ $m'$. Shaft $e$ carries also a fly-wheel $n$, a pulley $o$ and an eccentric $p$, the latter acting on the slide-valve within the valve-chest $q$, Figs. 1 and 2. The steam enters at $r$ and flows through the channels $s'$, $s^2$ and $s^3$ of the reversing-cock $s$, Fig. 5, and through the inlet $t$, Fig. 4, into the cylinder, thus driving the piston $d$ in the direction indicated by the arrow. The outlet $t'$ has its place on the other side of disk $i$, and the position of the latter is such, that no communication between inlet and outlet can take place. Thus, the consumed and expanded steam in front of the piston escapes freely through outlet $t'$, and further through the channels $s^4$ and $s^5$ of cock $s$. During the revolution of the piston, the disk $i$ is rotated, and, as soon as the piston arrives in front of the disk, the position of the latter is such, that cut $i'$ is in the under part of casing $h$, so that the piston may freely proceed in its motion. Inlet $t$ had been closed already before, according to the required degree of expansion, and is opened again, when the piston has passed it, and disk $i$ has been rotated sufficiently farther to remove cut $i'$ from the piston-passage $a^2$.

In order to reverse the engine, cock $s$ (which is shown perfectly closed in Fig. 5) is turned by forty-five degrees, by means of its handle $u$, so as to connect the channels $s'$, and $s^4$, and the channels $s^3$ and $s^6$, through which latter ($s^6$) the steam finally escapes.

What I do claim as my invention, and desire to secure by Letters Patent, is—

1. In a rotary motor with annular piston-passage, the combination with the piston $d$ revolving within passage $a^2$, and with disk $f$ fixed to shaft $e$, of an intermediate disk $g$, driven by the piston and adapted to transmit the motion of the latter to disk $f$, for the purpose as described.

2. In a rotary motor with annular piston-passage, the combination with the piston $d$ revolving within passage $a^2$, and with serrated disk $f$ fixed to shaft $e$, of a serrated intermediate disk $g$, driven by the piston and adapted to transmit the motion of the latter to shaft $e$, the serrations of both disks catching into another, for the purpose as described.

3. In a rotary motor with annular piston-passage, the combination with the piston $d$ revolving within passage $a^2$, and with disk $f$ fixed to shaft $e$, of an intermediate serrated disk $g$ loosely connected with, and driven by, the piston, and adapted to transmit the motion of the latter to shaft $e$, the serrations of both disks catching loosely into another, for the purpose as described.

In testimony whereof I have signed this specification in the presence of two subscribing witnesses.

GUSTAV HEINICKE.

Witnesses:
E. SCHULTZE,
H. GENEHR.